United States Patent [19]

Montsant

[11] 3,949,864

[45] Apr. 13, 1976

[54] FABRIC PRINTING MACHINE

[75] Inventor: Jose Aragones Montsant, Barcelona, Spain

[73] Assignee: Maquinaria de Impresion Textil, S.A., Gerona, Spain

[22] Filed: May 22, 1975

[21] Appl. No.: 579,797

[30] Foreign Application Priority Data

June 8, 1974 Spain .................................. 427105

[52] U.S. Cl. ................ 198/110; 198/203; 101/178; 101/228; 101/232; 226/32; 226/33; 226/178

[51] Int. Cl.$^2$ ....................B65G 23/00; B41F 13/54; B65H 23/18

[58] Field of Search ............... 198/40, 76, 110, 203; 101/178, 227, 228, 232; 250/223 R; 226/32, 33, 178; 318/593, 640

[56] References Cited

UNITED STATES PATENTS

| | | | |
|---|---|---|---|
| 3,254,778 | 6/1966 | Marland et al. | 198/110 |
| 3,315,860 | 4/1967 | Adams et al. | 226/178 |
| 3,605,465 | 9/1971 | Timmerbeil et al. | 226/33 |
| 3,706,370 | 12/1972 | Bonafino et al. | 198/203 |
| 3,713,571 | 1/1973 | Simonton | 226/32 |

FOREIGN PATENTS OR APPLICATIONS

| | | | |
|---|---|---|---|
| 729,728 | 5/1955 | United Kingdom | 226/32 |
| 1,288,016 | 1/1969 | Germany | 198/76 |

*Primary Examiner*—Evon C. Blunk
*Assistant Examiner*—Joseph E. Valenza
*Attorney, Agent, or Firm*—Woodhams, Blanchard and Flynn

[57] ABSTRACT

A fabric printing machine having a conveyor belt for supporting a fabric to be printed. A drive unit is connected to the belt, and a control mechanism coacts with the belt and the drive unit for permitting intermittent unidirectional advancing movement of the belt through a selected distance. The drive unit includes a first drive for advancing the belt at a fast speed and a second drive for advancing the belt at a slowspeed. The control mechanism includes a belt engaging device adapted for gripping engagement with the belt for causing synchronous movement of the belt and engaging device during the advancing movement. The control mechanism also includes means for activating the belt engaging device and for causing the first and second drives to be sequentially connected to the belt for moving the belt at fast speed through a first preselected distance and thereafter moving the belt at slow speed through a second preselected distance. A return device releases and returns the belt engaging device to its initial position.

6 Claims, 5 Drawing Figures

FABRIC PRINTING MACHINE

FIELD OF THE INVENTION

This invention refers to improvements in the construction of machines used in textile printing employing printing screens.

BACKGROUND OF THE INVENTION

The designs realized during the printing of fabrics are a result of superimposing, one on top of another, complimentary parts of the design, each being printed in its own color. This printing operation must be carried out with the greatest precision possible in order to avoid misalignment in the finished design. In general, the machine for printing such designs includes a bed upon which a conveyor belt advances intermittently, with the belt being moved through spaces of exactly the same lengths for moving the fabric to be printed, which fabric is attached to the belt. A plurality of printing screens are situated above the conveyor belt and are connected to movement devices which control the descending and ascending movement of the screens, which devices also cause the screens to pause when they are in their lower and upper positions. The movement of the screens is synchronized with the movement of the conveyor belt so that when the conveyor belt is stopped, the screens are held in their lower position for causing printing of the complimentary parts of the design.

From the point of view of the machine construction, the screen movement does not present any significant problem. However, this is not the case with respect to the conveyor belt. Since the conveyor is of rather large dimensions and consequently of considerable mass, the mechanisms controlling the intermittent advancing movement of the conveyor belt are necessarily rather complex and of considerable bulk in order to permit rapid intermittent advancing of the conveyor belt so that rather rapid printing can be achieved without exceeding the very limited error tolerance in the advancing movement length necessary for design alignment.

In fact, with conventional machines of the type described above, it frequently happens that the intermittent advancing movement of the conveyor belt cannot be controlled with the necessary degree of precision, so that the required registration or positioning of the individual parts of the finished design is not achieved, whereby the final printed design lacks the required degree of quality and thus results in an undesirable aesthetic effect which, in many instances, makes the printed fabric substantially worthless. Further, machines of this type do not, in all cases, result in the desired homogenity of the different colors, whereby the printed design on the fabric is of inferior quality.

Machines for printing fabrics employing multiple colors in the fabric design have also normally involved complex drive devices which are extremely costly and also require substantial repair, which further increases the overall cost of the finished fabrics by substantially increasing the loss of valuable production hours.

Thus, the present invention relates to improvements in a fabric printing machine and, in particular, to an improved control mechanism for controlling the intermittent advancing movement of the conveyor belt with sufficient precision to permit proper alignment of the complimentary parts of the printed design, which control mechanism is also dependable and economical, and can be composed from standard components which are generally available.

Other objects and purposes of the present invention will be apparent to persons acquainted with machines of this general type upon reading the following specification and studying the accompanying drawings.

BRIEF DESCRIPTION OF THE DRAWINGS

The accompanying drawings illustrate therein one practical embodiment of the invention, which embodiment is illustrated for purposes of example only and is not limiting as regards the scope of the invention.

In the drawings.

DETAILED DESCRIPTION

Figure 1:
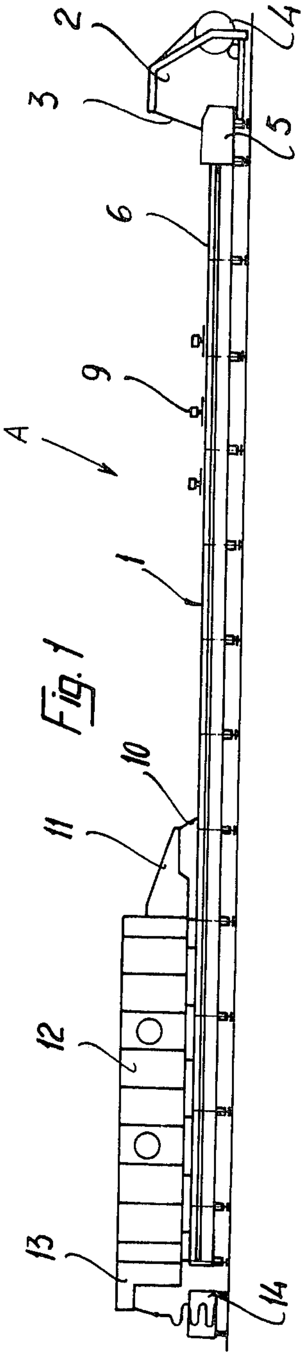
FIG. 1 is a diagrammatic elevational view of a fabric printing machine utilizing plane molds or printing screens, which machine incorporates therein the improvements of the present invention.

FIG. 1 illustrates a fabric printing machine A according to the present invention, which machine includes a generally extended support or bedframe 1 having an inlet or feeding station 2 at one end thereof. The fabric to be printed is located at the feeding station 2 and is in the form of a continuous band 3 which is wound on a feeding bobbin 4. The band 3 as unwound from the bobbin 4 is supplied to the station 5 whereby the fabric is arranged over the upper surface of an endless conveyor belt 6, which conveyor belt extends between and is movably supported by cylinders or rollers 7 and 8 (FIG. 3) disposed adjacent the opposite end of the frame. The conveyor belt 6 is driven so that the upper reach thereof is intermittently forwardly advanced (leftwardly in FIG. 1) in a steplike manner through steps or shifts of preset length, which steps must be of precise length, such as being held within a tolerance in the order of ±0.1 mm. The control mechanism for precisely determining the lengths of the conveyor belt shifts will be explained hereinafter.

A plurality of printing frames or screens 9 are sequentially arranged along and over the band of fabric which is supported on the conveyor belt, which printing frames 9 are intermittently raised and lowered so as to permit the individual frames to be used for the printing on the fabric of the different colored parts of the design.

The machine A is cyclically operated, with each individual cycle comprising four stages. The first stage consists of printing, and during this stage the conveyor belt is stationary and the printing frames 9 are in their lowermost positions whereby they are engaged with the fabric to permit the individual parts of the design to be printed. The second stage involves raising the printing frames upwardly out of engagement with the fabric. During the third stage, the conveyor belt 6 is forwardly advanced through a preselected step so that the partially printed designs on the fabric are advanced into alignment with the next adjacent printing frame. The fourth stage consists in the lowering of the printing frames into engagement with the fabric to permit the next sequential printing operation.

In the machine A, the printed fabric is removed from the conveyor belt at station 10, and, by means by a conveyor 11 synchronized with the conveyor belt 6, the printed fabric is moved into a dryer 12. The printed fabric is moved into the dryer 12 and is removed therefrom at 13, whereupon the printed fabric is deposited into suitable collection baskets 14.

Figure 3:
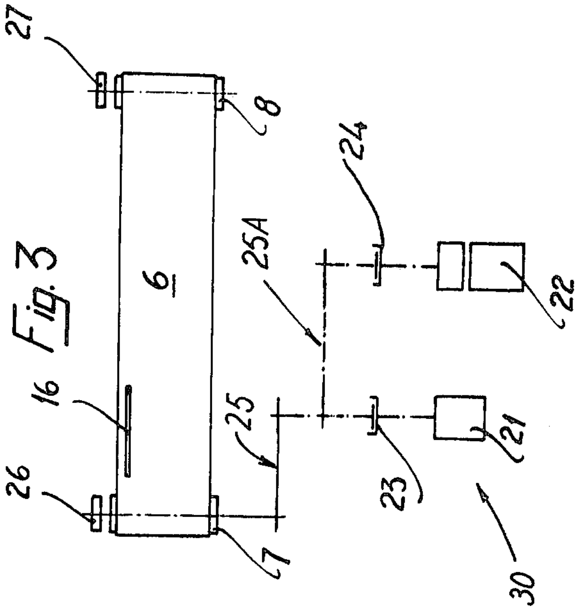
FIG. 3 is a plan view, on a reduced scale, diagrammatically illustrating the drive mechanism.
Figure 2:
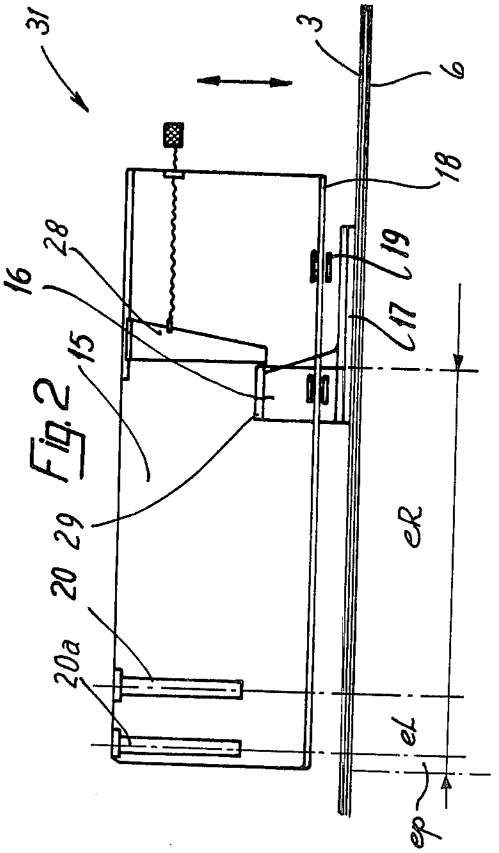
FIG. 2 is a diagrammatic elevational view of a portion of the control mechanism for driving the conveyor belt.

The intermittent advancing movement of the conveyor belt 6 is regulated by a control mechanism 31 which, as diagrammatically illustrated in FIGS. 2 and 3, includes a body 15 disposed above the conveyor belt 6 and supported for upward and downward movement. A control member 16 is mounted on the body 15 and, when the body 15 is in its lowermost position, the control member 16 engages the conveyor belt 6 by means of an elongated antisliding base 17. The lower edge of body 15 has an elongated flange 18 associated therewith, which flange extends along and substantially parallel to the conveyor belt 6 and functions as a guide member for the control member 16. Guide 18 has rollers 19 associated therewith which coact with the control member 16 for firmly clamping the control member 16 against the conveyor belt 6 when the body 15 is in its lowermost position. Thus, when the conveyor belt 6 is moved forwardly (leftwardly in FIG. 2), and with the control member 16 clamped against the conveyor belt, the control member 16 is also moved forwardly (leftwardly in FIG. 2) with the belt, which member 16 is guided by the flange 18.

During each step or shift of the conveyor belt, it is initially moved through a distance eR at relatively high speed. After traveling this distance, a flange or activator 29 as formed on the upper end of the control member 16 is disposed directly under a switch 20 which is mounted on the body 15. Activator 29 thereby activates the switch 20 which, on being activated, sends an electrical signal to a drive unit (hereinafter described), whereupon the conveyor belt is then moved forwardly through a further distance eL at a slower speed. After traveling through this additional distance eL, activator 29 then causes activation of a further switch 20A, which switch 20A again coacts with the drive unit so as to deactivate the driving of the conveyor belt 6. During this deactivation of the drive unit, the conveyor belt moves forwardly through a further small distance *ep* which represents the stopping distance of the system. Thus, the combination of the distances *eR*, *eL* and *ep* represents the preselected distance or length of movement of the conveyor belt so as to permit the fabric to be intermittently advanced from one printing frame to the next.

When the activator 29 causes activation of the switch 20A, a motor deactivating signal is emitted which causes deactivation of the driving unit, which signal also causes braking of the conveyor rollers 7 and 8. When the conveyor belt is thus stopped, the body 15 is lifted upwardly into its uppermost position by means of a conventional drive device (not shown), such as a fluid pressure cylinder, which causes the control member 16 to be lifted out of engagement with the conveyor belt. A motor (not shown), which motor can be mounted on the body 15, is then energized to cause the control member 16 to be movably guided backwardly along the rail 18 until the control member 16 reaches its starting point relative to the body 15 as illustrated in FIG. 2.

When control member 16 reaches its starting point, it engages an adjustable stop 28. The body 15 is then in position to be lowered for engagement with the belt 6 so that a new cycle of operation, identical to the cycle previously described, can then be performed.

To accomplish the two-speed advancing of the conveyor belt, a drive unit 30 as diagrammatically illustrated in FIG. 3 may be utilized. The drive unit includes two motors 21 and 22 which respectively control the slow and fast speed movement of the conveyor belt. Magnetic clutches 23 and 24 are associated with the motors 21 and 22, respectively. When the conveyor belt is to be advanced, an activating signal actuates the magnetic clutch 23 so that the high-speed motor 21 drives the conveyor belt 6 forwardly at high speed through the gear transmission 25, which transmission is connected to the roller 7. During this fast speed advance of the belt, the magnetic clutch 24 is disengaged. When the activator 29 reaches and causes activation of the switch 20, this switch sends a signal which causes deactivation of clutch 23 and also causes simultaneous activation of clutch 24, whereupon the conveyor belt 6 is then advanced forwardly at slow speed by being driven from the motor 22 by means of the intermediate belt transmissions 25 and 25A. When switch 20A is activated, it causes deactivation of both clutches 23 and 24 so that both motors 21 and 22 are disconnected from the conveyor belt. Switch 20A also causes the simultaneous activation of brakes 26 and 27, which brakes may be electromagnetic brakes associated with the conveyor rollers 7 and 8 for causing stopping of the conveyor belt.

Figure 4:
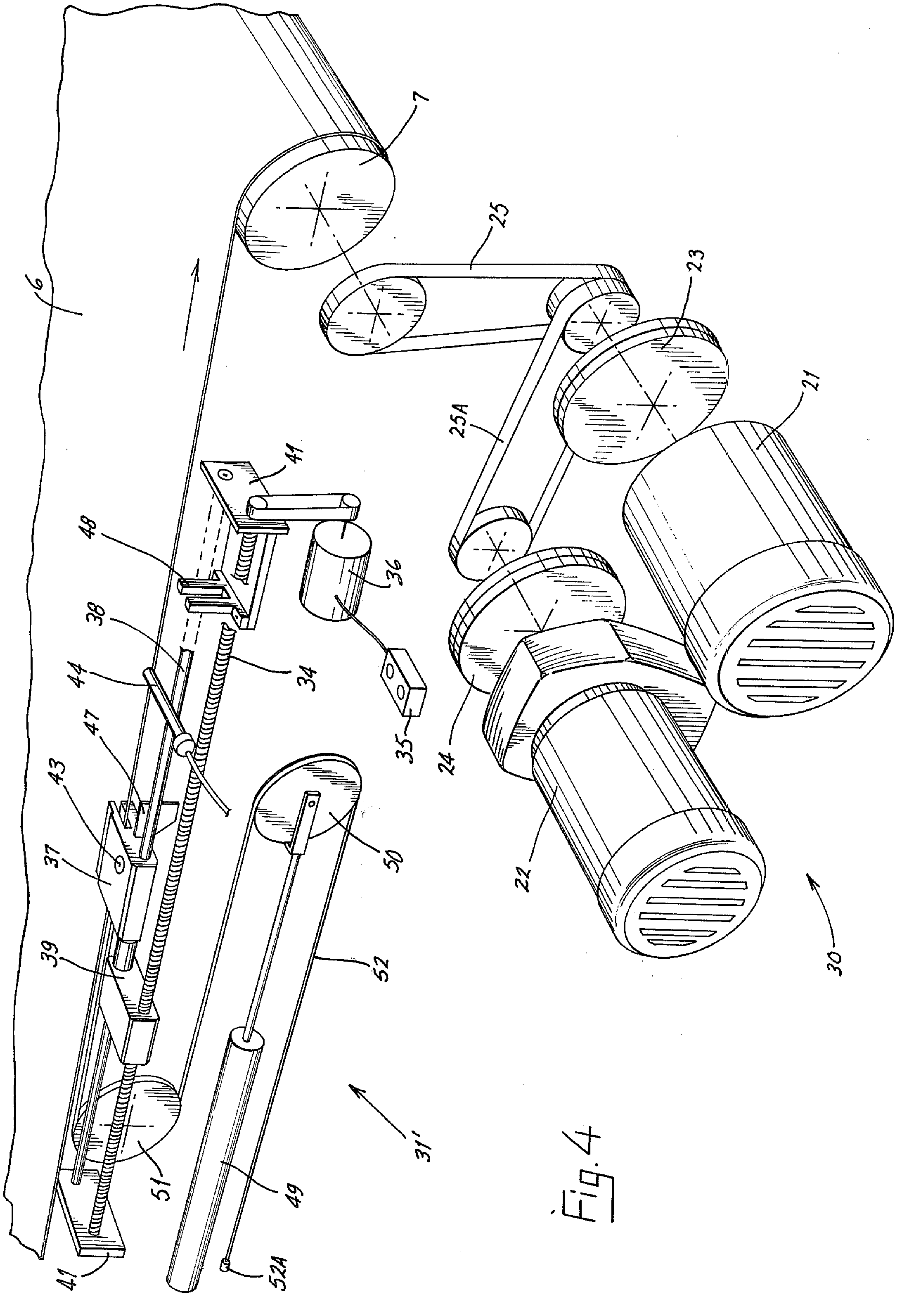
FIG. 4 is an enlarged perspective view of a modified control mechanism for causing intermittent advancing movement of the conveyor belt.
Figure 5:
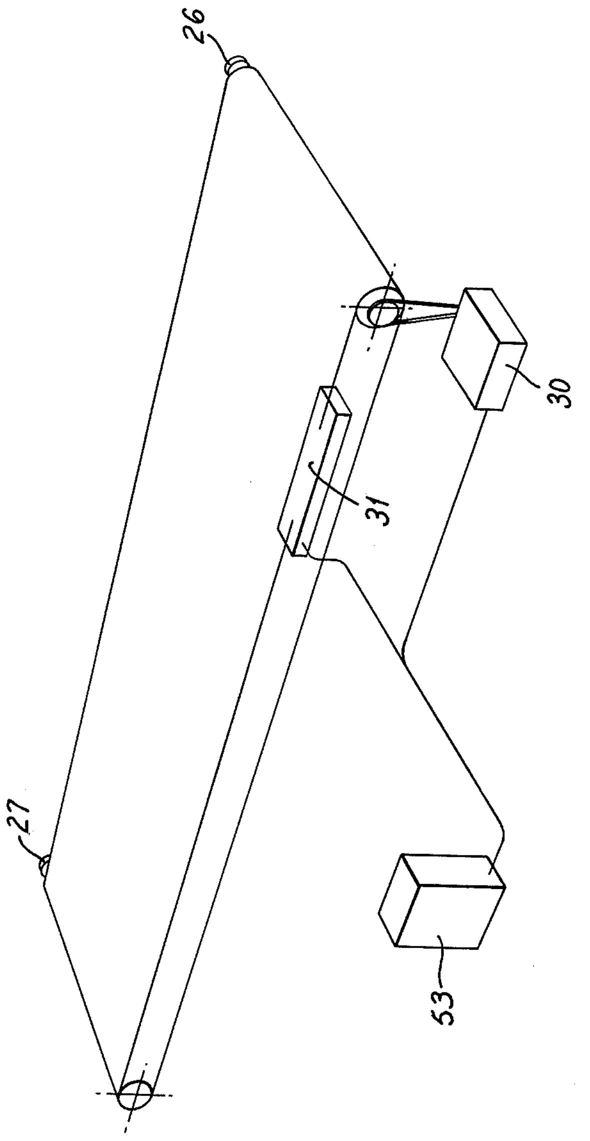
FIG. 5 is a diagrammatic perspective view of the control and drive mechanisms and their relationship to the conveyor belt.

Referring now to FIGS. 4 and 5, and specifically FIG. 4, there is illustrated a modified control mechanism 31′ for governing and controlling the intermittent advancing movement of the conveyor belt 6. The control mechanism 31′ of FIG. 4 is structurally similar to the mechanism 31 illustrated in FIG. 2 and operates in substantially the same manner.

More specifically, the control mechanism 31′ is positioned alongside the conveyor belt 6 and is supported on parallel bars 34 and 38 which extend between and are supported by a pair of spaced frame plates 41. The bar 34 is threaded throughout its length and is rotatable in opposite directions. Bar 34 is rotatably driven by a motor 36, which motor is activated by a pushbutton-type switch 35 which can be activated to cause rotation of the motor 36 in either direction. The other bar 38 functions solely as a slidable guide member.

A member 9 is slidably supported on the bar 38 and is threadedly engaged with the bar 34, which member 9 can thus have its position along the bars selectively adjusted by causing appropriate rotation of the bar 34. The member 9 functions as an adjustable end stop (equivalent to the stop 28 in FIG. 2) for determining the length of the conveyor belt advance.

The control mechanism 31′ includes a pincer-type control member 37 slidably supported on the bar 38, which control member 37 has a pair of relatively movable jaws disposed on opposite sides of the adjacent edge of the conveyor belt 6. The jaws can be relatively moved toward one another, as by being pneumatically actuated, for gripping the belt 6 therebetween. The jaws are returnable into their open positions, as by means of springs (not shown).

When the conveyor belt is to be advanced through a preselected distance, which distance is determined by the position of the member or stop 39, a signal will be emitted from the sequence control cabinet 53 (FIG. 5) so as to initiate a cycle of operation. This signal causes a pressure fluid, such as air, to be supplied through a conduit 52 to the control member 37, whereupon the jaws of the control member 37 are relatively moved into gripping engagement with the conveyor belt 6. The member 37, at the start of the advancing movement of the conveyor belt, is initially positioned in engagement with the stop 39. The initial signal for starting a cycle of operation also causes engagement of the clutch 23 so that the high speed motor 21, which is continuously rotating, drives the roller 7 so that the conveyor belt 6 is advanced at high speed. This high speed movement of the belt 6 carries the pincer 37 therewith, which pincer is slidably guided by the bar 38. As the pincer 37 approaches the switch 44, such as a magnetically actuated switch, an activator 43 as mounted on the pincer 37 causes activation of the switch 44, which in turn causes the clutch 23 to be disengaged while simultaneously causing engagement of the clutch 24. In this manner, the continuously driven low speed motor 22 is drivingly connected to the roller 7 so that the conveyor belt 6 continues to be advanced at a slow speed. The pincer 37 is continuously moved along with the belt 6 as it moves at this slower speed. After traveling through a selected distance at this lower speed, a plate 47 which is attached to the pincer 37 extends into and cuts the magnetic field created by a switch 48. This cutting of the field associated with the switch 48 causes the clutch 24 to be instantaneously disconnected and also causes the two electromagnetic brakes 26 and 27 to be activated for stopping the conveyor belt 6.

The operation of the pincer 37, and its coaction with the switches 44 and 46, is thus equivalent to the control member 16 and its coaction with the switches 20 and 20A respectively, as illustrated in FIG. 2.

After the conveyor belt 6 has been advanced through the preselected lengths, as explained above, the control cabinet 53 emits further signals for restoring the control mechanism to its initial position so as to permit a further cycle of belt advancing movement to take place. For this purpose, the pressure in the pincer 37 is relieved so that the jaws can return to their open positions. Further, the pneumatic cylinder 49 is then activated to extend its push rod so that the pulley 20 is moved forwardly (rightwardly in FIG. 4), which in turn causes the conduit 52 to be retracted and, since this conduit is connected to the pincer 37, the pincer 37 is retracted until it comes into engagement with the stop 39. The overall control mechanism is thus in condition to permit a new cycle of operation.

And is believed apparent, the end 52A of the conduit is suitably anchored, and the conduit 52 is also connected to a suitable source of pressure fluid, and as an air compressor, which compressor will have conventional valving associated therewith for controlling the flow of fluid to the conduit 52 and to the cylinder 49.

By moving the conveyor belt at high speed over a major portion of the stroke, while utilizing a slow speed for controlling the belt displacement through a small distance adjacent the end of the stroke, the length of conveyor belt displacement during each cycle of operation can be very precisely controlled so that the length or displacement distance can thus be controlled with very close tolerances in the order of ±0.1 mm, thereby permitting precise alignment of the belt and the fabric thereon at the sequentially located printing stations.

Further, in the invention of the present invention, the control mechanism 31 is engaged directly with the moving conveyor belt 6 so that any slippage between the belt 6 and the driving roller 7 does not effect the control mechanism nor the desired belt displacement. The control mechanism which determines the belt displacement distance is thus independent and totally free of regularities within the belt driving system. Further, the control mechanism permits the driving unit for the conveyor belt to be connected directly to the belt supporting rollers, which thereby greatly simplifies the overall structure and substantially reduces the overall cost.

Although a particularly preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a fabric printing machine having a conveyor belt for supporting thereon a fabric to be printed, a drive unit interconnected to said belt for moving same, and a control mechanism coacting with said belt and said drive unit for permitting intermittent unidirectional advancing movement of said belt through a selected distance, comprising the improvement wherein:

said drive unit including first drive means for advancing the conveyor belt at a fast speed and second drive means for advancing the conveyor belt at a slow speed;

elongated guide means disposed adjacent and extending substantially parallel to a portion of said conveyor belt;

said control mechanism including a belt engaging device slidably supported on said guide means, said belt engaging device including gripping means adapted for gripping engagement with said belt for causing synchronous movement of said belt and said engaging device during the advancing movement of said belt;

stop means coacting with said guide means for determining the initial position of said belt engaging device;

said control mechanism also including first means for causing activation of said gripping means so that same grippingly engages said belt when said belt engaging device is in said initial position and for causing said first drive means to be drivingly connected to said belt for moving said belt at said fast speed;

first switch means for deactivating said first drive means and interconnecting said second drive means to said belt, after said belt engaging device and said belt have been moved through a first preselected distance away from said initial position, for permitting further advancing movement of said belt at said slow speed;

second switch means for stopping said conveyor belt and said belt engaging device after they have been moved through a second preselected distance beyond said first preselected distance, said second preselected distance being small in comparison to said first preselected distance; and return means for releasing said gripping means from said belt, after displacement through first and second preselected distances, and returning said belt engaging device to said initial position.

2. A machine according to claim 1, further including adjustment means coacting with said stop means for permitting the location of said stop to be selectively varied, whereby said initial position can be varied to permit variation over the selected distance through which said belt is unidirectionally intermittently advanced.

3. A machine according to claim 1, wherein said first and second drive means respectively include first and second motor means, said first and second clutch means respectively associated with said first and second motor means for drivingly interconnecting the first and second motor means to the conveyor belt.

4. A machine according to claim 3, wherein activation of said first switch means causes disengagement of said first clutch means, wherein activation of said second switch means causes disengagement of said second clutch means, said conveyor belt being supported on and driven by a driving roller, said driving roller being drivingly interconnected to said first and second clutch means, and brake means associated with said driving roller and automatically actuated upon activation of said second switch means.

5. A machine according to claim 1, wherein said gripping means includes a pair of relatively movable jaws which are positioned adjacent one edge of said belt and are disposed on opposite sides thereof, said jaws being relatively movable towards one another for gripping the edge of said belt therebetween, said belt engaging device having an activator associated therewith for causing activation of said first and second switch means.

6. A machine according to claim 5, wherein said jaws are pneumatically actuated for relatively moving same toward one another for grippingly engaging said belt, an elongated flexible conduit connected to said belt engaging device for supplying pressure fluid thereto for activating said jaws, and a driving device connected to said elongated flexible conduit for moving same to cause return movement of said belt engaging device to said initial position.

* * * * *